Feb. 13, 1962 A. M. SPOUND 3,021,098
RECLINING VEHICLE SEAT CONSTRUCTION
Filed Sept. 26, 1960
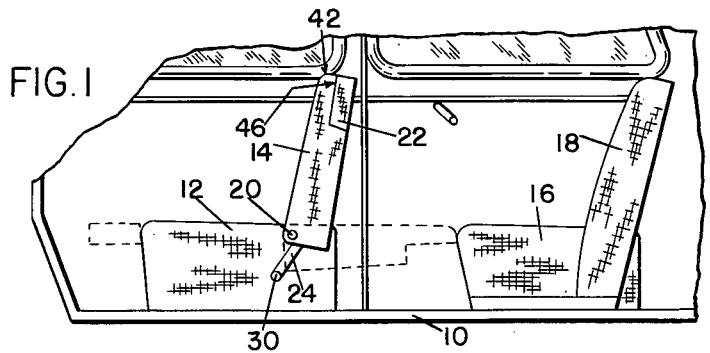
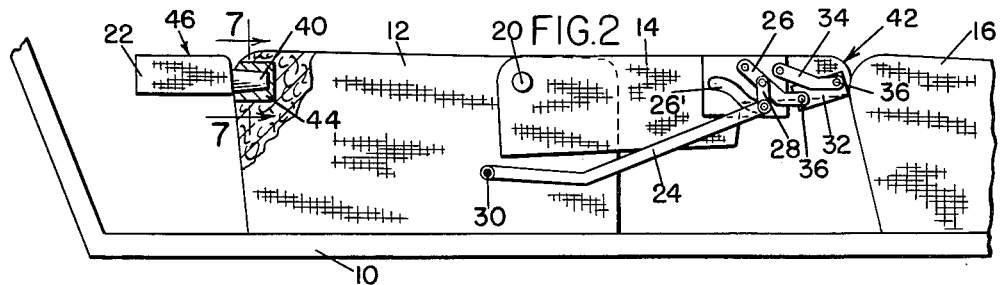
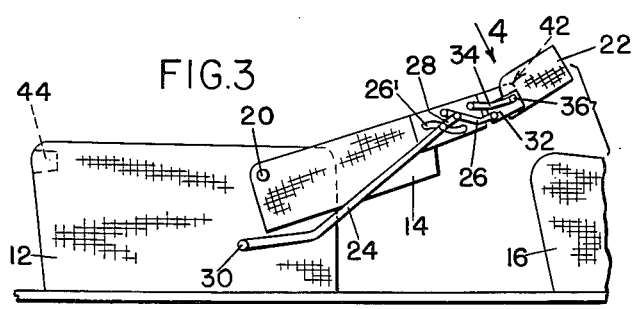
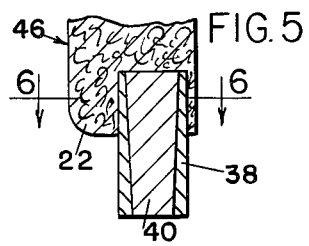
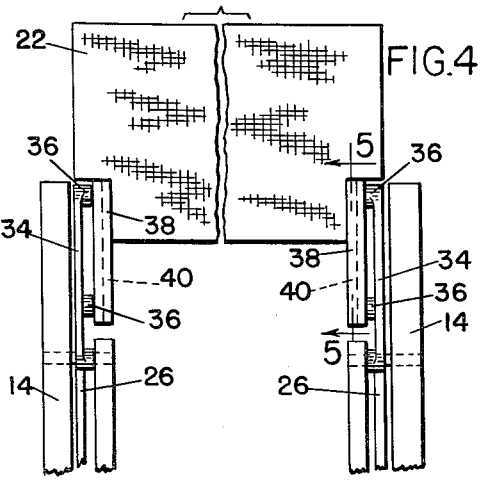
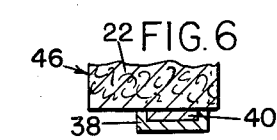
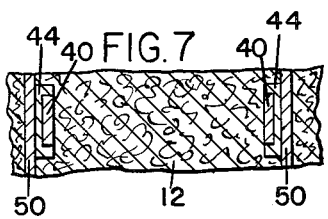
INVENTOR
ALBERT M. SPOUND
by Charles R. Fay
ATTORNEY

United States Patent Office 3,021,098
Patented Feb. 13, 1962

3,021,098
RECLINING VEHICLE SEAT CONSTRUCTION
Albert M. Spound, Wellesley Hills, Mass.
(% Charlton Co., Fitchburg, Mass.)
Filed Sept. 26, 1960, Ser. No. 58,395
3 Claims. (Cl. 297—61)

This invention relates to a reclining seat construction particularly adapted to vehicles such as automobiles, including the provision of a movable headrest mounted in association with the backrest of the front seat and normally concealed from view so that the backrest appears to be exactly as normal but yet having means whereby the headrest may be projected upwardly and forwardly in reclining position of the backrest for the comfort of the occupant, and the principal object of the invention includes the provision of a headrest of the class described which while it may be projected to carry out the purposes of the invention, is nevertheless quickly and easily detachable from the backrest and is re-attachable or positionable at the front edge of the front seat upon which the headrest and backrest combination is mounted for the purpose of increasing the width of the seat and providing a full bed length resting support for the occupant when the backrest is fully down; the backrest itself extends to the forward edge of the rear seat of the vehicle and the projected headrest therefor is not usable in this position but nevertheless may be removed from its mounting on the backrest and inserted on a mounting or plate at the forward edge of the front seat of the vehicle to provide a footrest, thus extending the fully reclined condition of the seat to a full bed-length support not now found in the art.

The invention further relates to arrangements and combinations of parts which will be hereinafter described and more particularly set forth in the appended claims.

Reference is to be had to the accompanying drawings, in which

FIG. 1 is a diagrammatic view illustrating the interior of an automobile showing the backrest of the front seat in sitting position in solid lines and in fully reclined position in dotted lines;

FIG. 2 is a view on an enlarged scale with parts in section illustrating the seat moved to its downwardmost position in fully reclined position of the device;

FIG. 3 is a diagrammatic view illustrating the headrest in use in a reclining or semi-reclining conditon;

FIG. 4 is a view on an enlarged scale looking in the direction of arrow 4 in FIG. 3;

FIG. 5 is a section on line 5—5 of FIG. 4;

FIG. 6 is a section on line 6—6 of FIG. 5; and

FIG. 7 is a sectional view on line 7—7 of FIG. 2.

In carrying out the present invention, a more or less conventional automobile interior is shown in FIG. 1 where the doors and windows, etc. and floorboard 10 are readily apparent. The front seat is generally indicated at 12 and this is provided with a reclining backrest 14. There is a rear seat 16 and a backrest 18 for the rear seat. The rear seat is substantially conventional.

The backrest 14 is mounted as for instance on a pivot 20 and through means to be described, it provides for a projectible headrest generally indicated at 22. This headrest is normally concealed as shown in FIG. 1 and its presence is not at once apparent as the combination of backrest 14 and the headrest 22 appear to be substantially the same as the normal backrest of a vehicle seat.

However, as shown in FIG. 3, when the backrest 14 is moved to the rear, i.e., in reclined or semi-reclined condition, the headrest 22 is automatically moved upwardly and forwardly relative to the backrest in order to provide a headrest for the occupant of the seat 12 in any position from a slightly reclining position to a position which is almost fully reclined.

The mechanism by which this projection is provided is accomplished by means of a driving rod 24 which actuates a parallel bar linkage 26, 34 through the intermediary of a link 28 guided by a slot 26'. Driving rod 24 has a fixed pivot at 30. All of this mechanism is concealable within the upholstery of the backrest 14, see FIG. 1, and it operates substantially as described in Patent No. 2,884,992 dated May 5, 1959.

When the backrest 14 is moved toward upright condition in the opposite direction, as it may be moved either manually or under the influence of counterbalancing springs, etc., not shown, the headrest 22 automatically and smoothly moves downwardly and to the rear from the FIG. 3 position back to the FIG. 1 position.

One of the essential parts of the present invention resides in the fact that headrest 22 is quickly and easily removable from the bracket 32 upon which it is mounted, this bracket being connected to the levers of the parallel bar linkage. There are of course two brackets 32 as well as two parallel bar linkages, one located at each side of the headrest, as clearly shown in FIG. 4. Each bracket 34 is provided with a pair of bosses or the like 36 which mount plate-like tapered guideways indicated at 38. The headrest 22 in turn is provided with a pair of correspondingly tapered plates 40 which are slidably mounted with relation to the tapered guideways as clearly shown in FIGS. 5 and 6, and when desired the entire headrest 22 may be removed from the guideways 38 simply by pulling upwardly on the headrest 22 as for instance when it is in the upright position of FIG. 1. Of course it can also be removed when the backrest 14 is in the FIG. 3 position.

When the headrest is thus removed, even though the parallel bar linkage is actuated, the bracket 32 does not extend above the top of backrest 14, this point being indicated at 42 in FIGS. 1 and 2, and therefore it will be seen that the entire backrest 14 can be dropped back to a horizontal position, see FIG. 2, and form a straight-line support with the rear seat 16 and the front seat 12 bridged by the backrest 14.

The headrest 22 being now completely removed from the apparatus as described, is reversed and inserted and held in spaced plates 44 which are mounted near the top of the forward edge of the front seat 12, plates 44 being very similar to those at 38 and holding the headrest with the forward surface thereof which is indicated at 46 uppermost. Since plates 40 are located at the rearward portion of the headrest 22, see FIG. 5, this provides an elevated portion which is substantially in line with the top surface of seat 12, so that the occupant now has a footrest and a complete full-length resting place.

It will thus be seen that the present headrest construction provides a dual purpose, both as a headrest and a footrest, and is easily manually operated merely by pulling the same out of the brackets 34 and re-inserted in plates 44. The reference numerals 50 in FIG. 8 indicate a part of a seat frame, or some other means for supporting plates 44 in the position shown on the seat construction 12.

Having thus described my invention and the advantages thereof, I do not wish to be limited to the details herein disclosed, otherwise than as set forth in the claims, but what I claim is:

1. A device of the class described comprising a seat, a backrest pivoted thereon providing for motion of the backrest from a generally upright sitting condition to a rearwardly inclined position, a headrest on said backrest adapted for movement from a substantially concealed position in the sitting position of the backrest to an advanced and raised position acting as a headrest when the backrest is inclined, said headrest being removable, and means at the forward portion of said seat receiving said headrest in extension of said seat to form a footrest with the backrest fully reclined.

2. A seating construction comprising a forward seat and a rear seat, a movable backrest on the forward seat, the backrest being movable from a sitting position to an inclined position and then to a horizontal position in extension of said forward seat, a movable headrest on said backrest, said headrest extending beyond the space between the forward seat and the rear seat when the backrest is inclined, means movably holding the headrest on the backrest, and said headrest being selectively re-positionable at the forward edge of the forward seat acting as a footrest whereby the backrest may be moved to bridge the gap between the two seats and said headrest provides an extension of the resting surface at the front edge of the forward seat.

3. A seating construction comprising a forward seat and a seat to the rear thereof, a movable backrest on the forward seat, the backrest being movable from a sitting position to an inclined position and then to a horizontal position in extension of said forward seat, a movable headrest on said backrest, means normally positioning the headrest within the confines of the backrest and moving the same outwardly to form a headrest when the backrest is in inclined position, a said headrest extending beyond the space between the forward seat and the rear seat when the backrest is inclined, means movably holding the headrest on the backrest, and said headrest being selectively re-positionable at the front edge of the forward seat acting as a footrest whereby the backrest may be moved to bridge the gap between the two seats and said headrest provides an extension of the resting surface at the front edge of the forward seat.

References Cited in the file of this patent

UNITED STATES PATENTS

| 1,208,319 | Hughes | Dec. 12, 1916 |
| 1,360,162 | Westrum | Nov. 23, 1920 |
| 1,378,615 | Rehanek | May 17, 1921 |